United States Patent
Troxel et al.

(10) Patent No.: US 6,535,934 B2
(45) Date of Patent: Mar. 18, 2003

(54) TRANSFERRING DATA FROM DISK STORAGE DIRECTLY TO A PERIPHERAL DEVICE

(75) Inventors: Donald E. Troxel, Belmont, MA (US); James J. Guerrera, Lowell, MA (US)

(73) Assignee: ECRM, Incorporated, Tewksbury, MA (US)

(*) Notice: Subject to any disclaimer, the term of this patent is extended or adjusted under 35 U.S.C. 154(b) by 0 days.

(21) Appl. No.: 09/947,723

(22) Filed: Sep. 6, 2001

(65) Prior Publication Data

US 2002/0007424 A1 Jan. 17, 2002

Related U.S. Application Data

(63) Continuation of application No. 08/731,300, filed on Oct. 15, 1996.

(51) Int. Cl.[7] ............................................... G06F 13/14
(52) U.S. Cl. ............................................ 710/31; 710/26
(58) Field of Search ........................... 710/5, 128, 129, 710/33, 31, 26; 714/1; 711/2; 345/327; 395/894

(56) References Cited

U.S. PATENT DOCUMENTS

| | | | | |
|---|---|---|---|---|
| 5,249,279 A | * | 9/1993 | Schmenk et al. | 710/5 |
| 5,404,463 A | * | 4/1995 | McGarvey | 710/128 |
| 5,446,877 A | * | 8/1995 | Liu et al. | 714/1 |
| 5,461,721 A | * | 10/1995 | Cormier et al. | 711/2 |
| 5,481,403 A | * | 1/1996 | Muir | 710/128 |
| 5,566,306 A | * | 10/1996 | Ishida | 710/129 |
| 5,818,438 A | * | 10/1998 | Howe et al. | 345/327 |
| 5,867,733 A | * | 2/1999 | Meyer | 395/894 |
| 5,898,891 A | * | 4/1999 | Meyer | 710/33 |

* cited by examiner

Primary Examiner—David Ton
(74) Attorney, Agent, or Firm—Hale and Dorr LLP

(57) ABSTRACT

A method for transferring data (for example, image data) from disk storage directly to a peripheral device (for example, a pelbox) in which address information identifying disk storage locations where the data is stored is sent to the peripheral device, and a command is sent to the peripheral device to initiate data transfer from disk storage directly to the peripheral device using the address information received by the peripheral device.

19 Claims, 5 Drawing Sheets

TRANSFERRING DATA FROM DISK STORAGE DIRECTLY TO A PERIPHERAL DEVICE

This is a continuation of application No. 08/731,300, filed Oct. 15, 1996.

BACKGROUND OF THE INVENTION

The invention relates to transferring data from disk storage directly to a peripheral device.

A host computer often stores data for use by a peripheral device on a storage disk (for example, a hard disk). The host computer typically transfers the data to the peripheral device first by reading the data from the storage disk to host computer random access memory (RAM) over a SCSI (small computer system interface) bus, and then by transferring the data from the host computer RAM to the peripheral device over the same SCSI bus.

Some peripheral devices, such as pelboxes and scanners, require a sustained transfer of a large amount of data with the host computer. A pelbox is used to generate high resolution digital images from bit-mapped image data. The image data controls a laser that is scanned across a film which is simultaneously moved through the scan path of the laser. For optimal results, an entire image should be transferred without interruption. A pelbox typically has a local RAM buffer with only 4 Mbytes or 8 Mbytes of available memory; a typical pelbox image, on the other hand, requires on the order of about 300 Mbytes of memory storage. Therefore, for optimal results, the host computer must continue to update the local pelbox buffer with new image data until the entire image has been transferred to film.

SUMMARY OF THE INVENTION

If the host computer must respond to arbitrary interruptions, such as network traffic, system calls, or demands imposed by multi-processing or multi-tasking, the time required to transfer an entire data file may exceed allowable system delays, in which case the transfer will be corrupted. In the case of a pelbox, such data transfer failure would result in wasted film.

The inventors have realized that improved results can be achieved by transferring data from disk storage directly to the peripheral device.

In one aspect, the invention features a method for transferring data from disk storage directly to a peripheral device by sending to the peripheral device address information identifying disk storage locations where the data is stored, and sending to the peripheral device a command to initiate data transfer from disk storage directly to the peripheral device using the address information sent to the peripheral device.

In one preferred embodiment, the peripheral device is a pelbox and image data is transferred from disk storage directly to the pelbox.

The storage disk is preferably exclusively controlled by the peripheral device. The peripheral device preferably releases the storage disk from its exclusive control when the amount of unused data stored in peripheral device memory is greater than an upper threshold. The storage disk is preferably under the exclusive control of the peripheral device when the amount of unused data written to peripheral device memory is less than a lower threshold. Data identifying the data file may be transferred from disk storage directly to the peripheral device before the data file is completely written from the host computer to disk storage. Different sections of a data file may also be stored on more than one storage disk, and the different data sections may be transferred from each of the storage disks directly to the peripheral device over one or more communication channels. The data transferred to the peripheral device may be stored in a contiguous sequence of disk blocks or in more than one contiguous sequence of disk blocks with one or more non-transfer-data disk blocks interposed therebetween.

By this inventive data transfer method, the host computer is not involved in the real time data transfer between the peripheral device and disk storage. The maximum interrupt latency of the host computer therefore does not have to be considered in the design of the system and a smaller peripheral RAM can be used. Data travels from disk storage directly to the peripheral device, reducing data transfer time relative to methods in which data is first read into host computer RAM and subsequently transferred to the peripheral device. Also, since the host computer is not involved in the real time data transfer, a separate SCSI driver is not needed to enable the host computer to transfer data to the peripheral device.

Other features and advantages of the invention will become apparent from the following.

DESCRIPTION OF THE PREFERRED EMBODIMENTS

Figure 1:
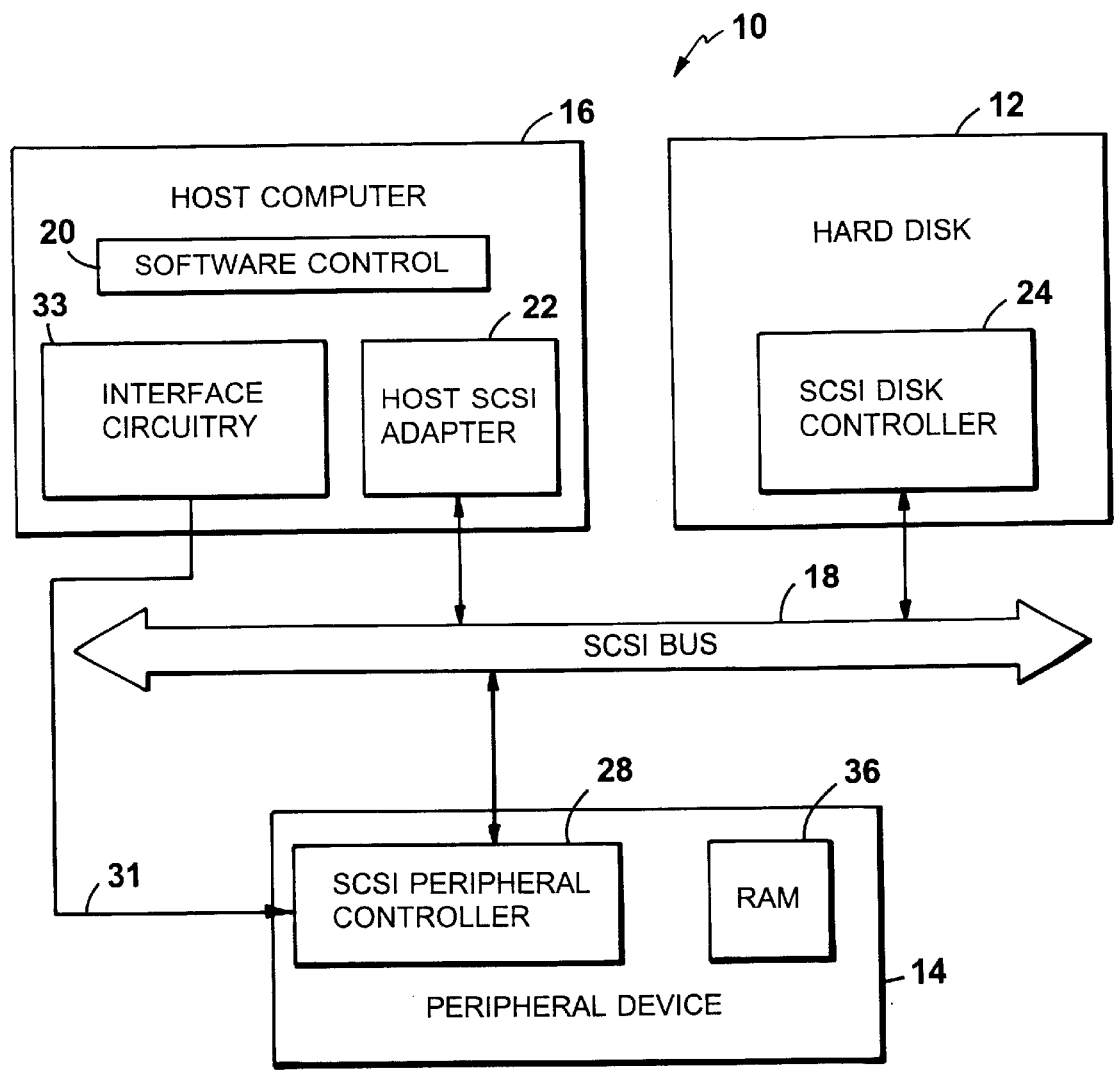
FIG. 1 is a schematic diagram of a system for transferring data from disk storage directly to a peripheral device.

Referring to FIG. 1, a system 10 for transferring data (for example, image data) from a hard disk 12 directly to a peripheral device 14 (for example, a pelbox) includes a host computer 16 and a SCSI bus 18. Host computer 16, under software control 20, writes a data file to hard disk 12 over SCSI bus 18. The host computer determines a record of address information identifying the locations where the data file is stored on hard disk 12. The host computer communicates with the SCSI bus through a host SCSI adapter 22, and the hard disk communicates with the SCSI bus through a SCSI disk controller 24. A peripheral controller 28 enables the peripheral device to communicate with the SCSI bus.

In the case of a pelbox, the image data stored on hard disk 12 is used by the pelbox to expose film. The image data is stored in a binary tiff file with each byte containing 8 picture elements. The pelbox transfers a line of picture elements across the film one byte at a time until the end of the line is reached; at which point the pelbox begins a new line. The pelbox continues this process until the entire image has been transferred.

Figure 2:
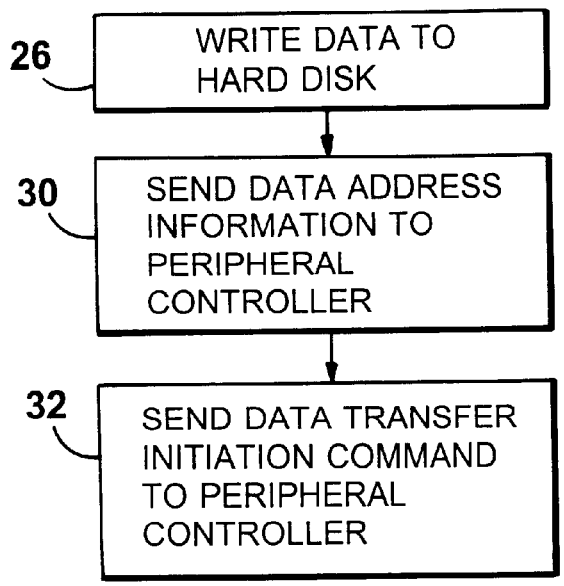
FIG. 2 is a flow diagram of a method for transferring data from disk storage directly to a peripheral device.

Referring to FIG. 2, before data is transferred from hard disk 12 directly to peripheral device 14, the host computer performs the following sequence of steps. The host computer first writes a data file to hard disk 12 at 26; the host computer may only have to modify the file format for images already stored on the hard disk. The host computer sends the data address information to the peripheral device at 30. The host computer then sends to the peripheral device a command to initiate data transfer from the hard disk directly to the peripheral device at 32.

Before the data file is written to hard disk 12 at 26, a software program running on the host computer processes an input file (for example, a postscript file) and produces a formatted data file (for example, a binary tiff file) that the host computer writes to hard disk 12. The format of the data file is suitable for direct transfer through peripheral controller 28 to the peripheral device. A first file format consists of a contiguous sequence of 64K byte buffers, each of which contains an integer number of lines of data. Each of the 64K byte buffers has the same number of lines except the last buffer, which may have a fewer number of lines. Each of the lines starts on a four byte aligned boundary. The unused space in each buffer can be cleared to 0 if desired. In a second file format, the data file need not be contiguous, and arbitrary gaps (any number of disk blocks) can be interposed between any of the 64K byte buffers. In a third file format, there need not be an integer number of lines or 64K byte buffers, and arbitrary gaps (any number of disk blocks) can be interposed between any of the disk blocks.

The host computer sends the address information to the peripheral device over, for example, an RS232 serial communication channel 31 that is coupled to host interface circuitry 33 (FIG. 1). Alternatively, the address information can be sent over a network socket connection or SCSI bus 18 (FIG. 1) using a suitable SCSI driver running on the host computer. In addition to address information, other information can be communicated between the host computer and the peripheral device. For example, the peripheral device can periodically write status information to a specified hard disk block, and the host computer can poll the status of the peripheral device by periodically reading this specified disk block. Communications between the host computer and the peripheral are not required to be in "real time"; real time data transfers are instead initiated by the peripheral device independently of the host computer to transfer data directly from the hard disk.

Address information is sent to the peripheral device so that the peripheral device can access data directly from the hard disk. To access data stored on the hard disk, the peripheral device uses the sequence of hard disk blocks identifying locations where the data file is stored. In one method, the host computer always stores the data file at the same hard disk address and the peripheral device directly accesses the data file by reading the data at this hard disk address. In another method, the data file is stored in one or more contiguous sequences of disk blocks and the host computer sends to the peripheral device a run-length coded list of disk blocks (any suitable coding method can be used). For example, if the first file format described above is used, the host computer sends the following address information to peripheral controller 28: beginning block number, number of blocks, number of lines per block, number of lines per file, and line length. If the second file format is used, the host computer sends to peripheral controller 28 a list of pairs of numbers corresponding to the beginning block number and the number of blocks for each section of the data file stored on the hard disk. With the third file format, where there need not be an integer number of lines or 64K byte buffers and arbitrary gaps can be interposed between any of the disk blocks, the host computer sends to peripheral controller 28 the number of lines per file, the line length, and a list of pairs of numbers corresponding to the beginning block number and the number of blocks for each section of the data file stored on the hard disk.

Figure 3:
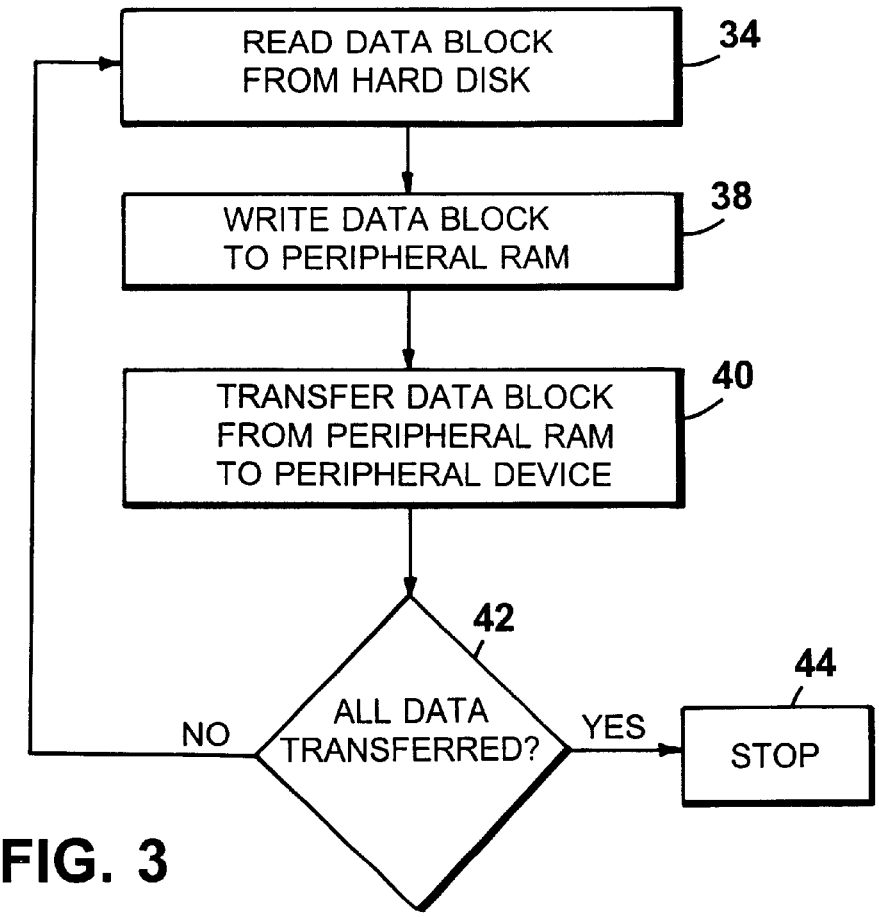
FIGS. 3 and 3A are flow diagrams of methods for transferring data from disk storage directly to a peripheral device. The activities depicted in these two figures occur simultaneously and for the most part asynchronously.

Referring to FIG. 3, after peripheral controller 28 receives the address information from the host computer and receives the command to start transferring data, the peripheral controller performs the following sequence of steps. A data block is read directly from hard disk 12 at 34. The data block is written to peripheral RAM 36 (FIG. 1) at 38. Data is transferred at 40 from peripheral RAM 36 to the peripheral device for use in a peripheral device application, such as controlling a laser which selectively exposes a cassette of film in the case of a pelbox. If the complete data file has been transferred to the peripheral device at 42, data transfer is stopped at 44; otherwise, a subsequent data block is read from the hard disk at 34.

Figure 3A:
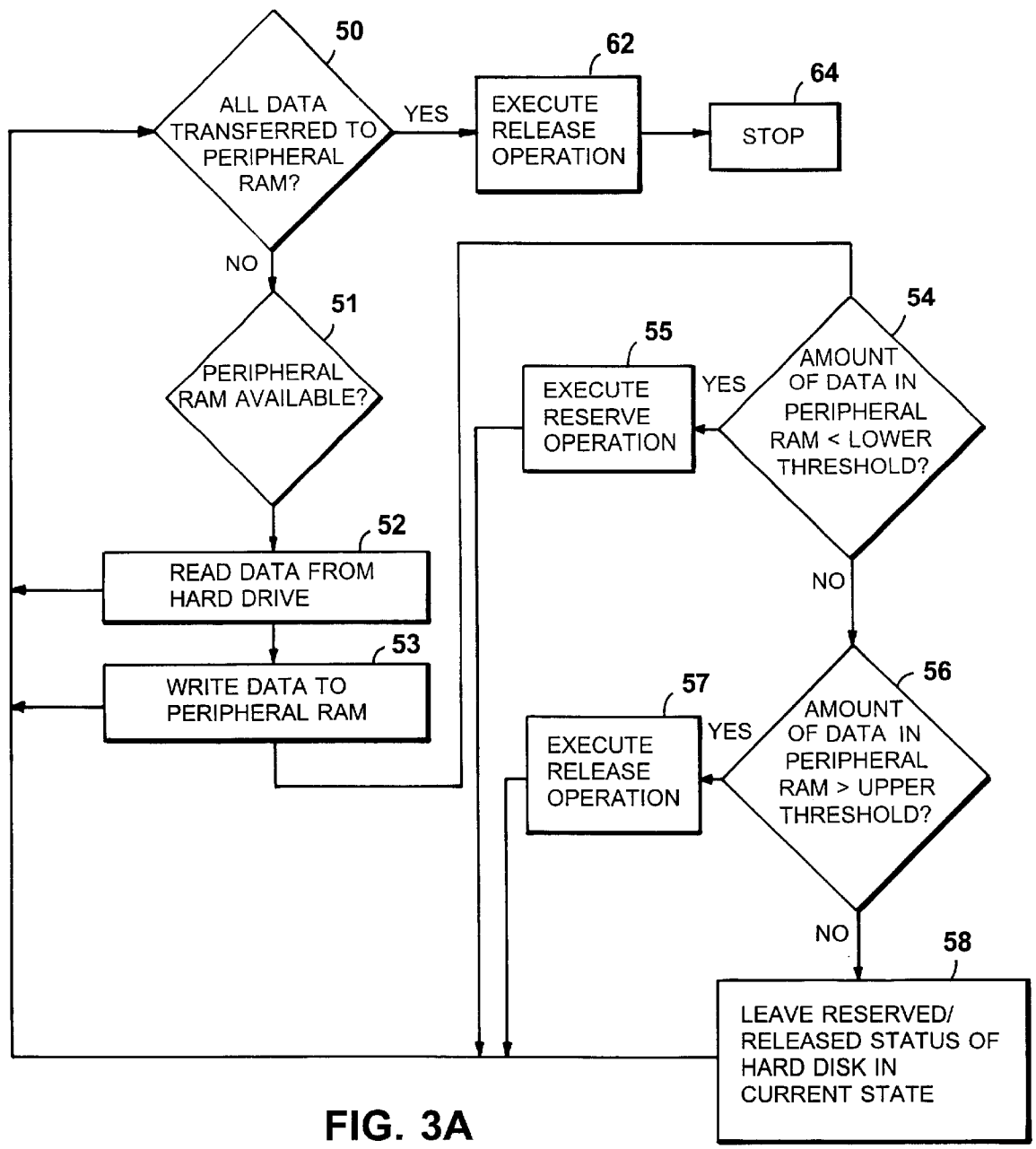

Referring to FIG. 3A, the peripheral device performs the following sequence of steps independently of the host computer to enable the host computer to write data to the hard disk concurrently with the transfer of data to the peripheral device. The system determines whether all of the data has been transferred at 50, and determines whether the peripheral RAM is available at 51. If all of the data has not been transferred and the peripheral RAM is available, a data block is read from the hard disk at 52. The data block is written to peripheral RAM at 53. If the amount of unused data stored in peripheral RAM is below a lower threshold, such as 20–25% of capacity at 54, peripheral controller 28 executes a SCSI reserve operation to seize exclusive control of the hard disk at 55, and a subsequent data block is read from the hard disk at 52 (assuming more data needs to be transferred and the peripheral RAM is available). If the amount of unused data stored in peripheral RAM is above an upper threshold, such as 75–80% of capacity at 56, peripheral controller 28 releases the hard disk from the exclusive control of the peripheral device at 57 to allow the host computer to write additional data to the hard disk; otherwise peripheral controller 28 does not change the status of the hard disk at 58, and a subsequent data block is read from the hard disk directly to the peripheral device at 52 (assuming more data needs to be transferred and the peripheral RAM is available). If the entire data file has been transferred at 50, peripheral controller 28 releases the hard disk from the exclusive control of the peripheral device at 62 to allow the host computer to write additional data to the hard disk, and the data transfer routine is stopped at 64.

Other embodiments are within the scope of the claims.

Figure 4:
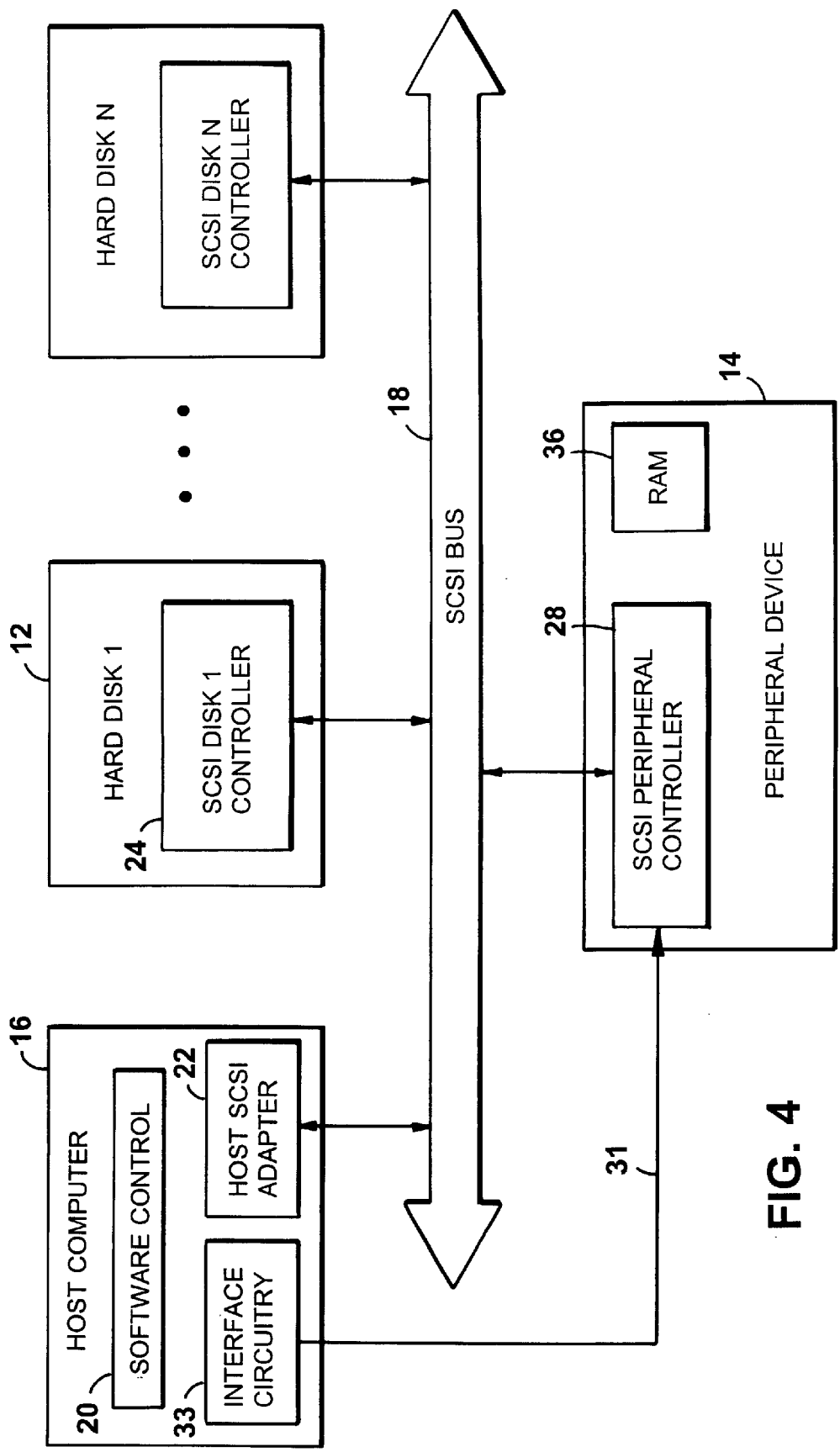
FIGS. 4 and 4A are schematic diagrams of systems for transferring data from disk storage directly to a peripheral device.

Referring to FIG. 4, a data file can be divided into different sections each of which is stored on a respective one of a plurality of hard disks (N hard disks are to be inferred from the drawing, with N>1). In addition to the disk block address information, the host computer sends peripheral controller 28 information identifying the particular disk on which the data blocks are stored. The peripheral device then accesses the image information by multiplexing the data from the hard disks. Each hard disk can transfer data stored on the periphery of the disk at a higher rate than data stored on the interior of the disk because the speed of the read/write head over the disk surface is higher at the periphery. In one embodiment, image data can be stored only at peripheral disk regions, which allows the disks to operate at their peak data transfer rate and therefore provides a higher effective disk bandwidth (Mbytes/second) relative to embodiments with only one hard disk.

Figure 4A:
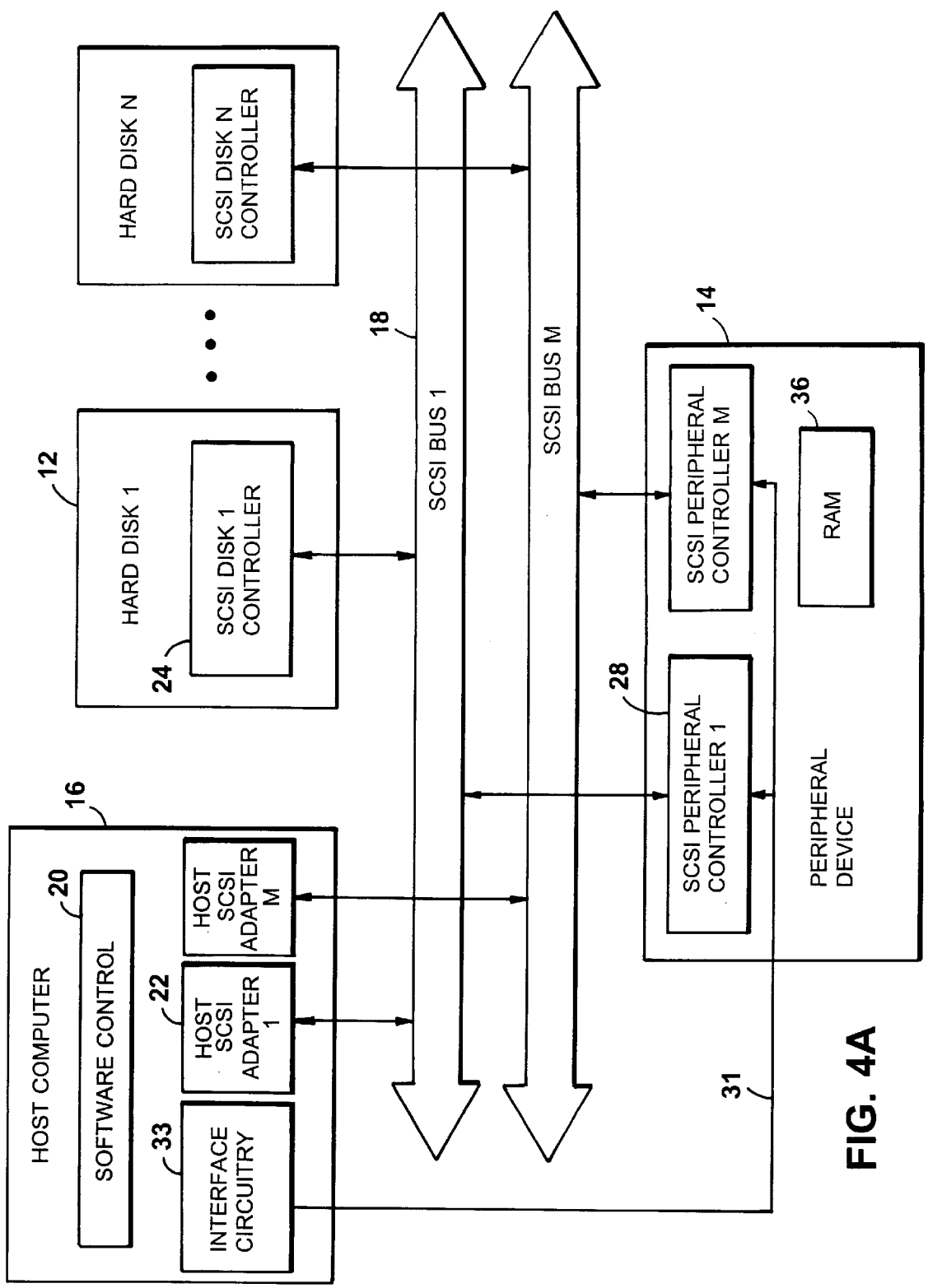

Referring to FIG. 4A, in another embodiment, a plurality of SCSI buses are used with one or more hard disks supported on each bus (N hard disks and M SCSI buses are to be inferred from the drawing, with N>1 and M>1). The host computer includes a SCSI host adapter for each SCSI bus, the peripheral device includes a peripheral controller for each SCSI bus; each hard disk includes a respective SCSI disk controller. This embodiment has a higher SCSI bandwidth relative to the bandwidth of a system that has a single SCSI bus.

Still other embodiments are within the scope of the claims.

What is claimed is:

1. A method for transferring data from a storage disk directly to a peripheral device comprising the steps of:

sending to the peripheral device address information identifying the storage disk locations where the data is stored;

sending to the peripheral device a command to initiate data transfer from the storage disk directly to the peripheral device using the address information sent to the peripheral device; and causing the storage disk to be exclusively controlled by the peripheral device.

2. The method of claim 1 further comprising the step of transferring data from the storage disk directly to the peripheral device.

3. The method of claim 2 further comprising the step of writing to peripheral device memory the data transferred from the storage disk.

4. The method of claim 3 further comprising the steps of using data written to peripheral device memory for a peripheral device application, and monitoring the amount of unused data stored in peripheral device memory.

5. The method of claim 4 further comprising the step of releasing the storage disk from the exclusive control of the peripheral device when the amount of unused data stored in peripheral device memory is greater than an upper threshold.

6. The method of claim 4 wherein the storage disk is caused to be under the exclusive control of the peripheral device when the amount of unused data written to peripheral device memory is less than a lower threshold.

7. The method of claim 2 further comprising the step of writing a data file from a host computer to the storage disk.

8. The method of claim 7 wherein data corresponding to the data file is transferred from the storage disk directly to the peripheral device before the data file is completely written from the host computer to the storage disk.

9. The method of claim 1 further comprising the steps of writing different sections of a data file to more than one storage disk, and transferring the different data sections from the storage disks directly to the peripheral device.

10. The method of claim 9 wherein the data is transferred from each storage disk directly to the peripheral device over more than one communication channel.

11. The method of claim 1 wherein the data transferred to the peripheral device is stored prior to transfer in the storage disk in a contiguous sequence of disk blocks.

12. The method of claim 1 wherein the data transferred to the peripheral device is stored prior to transfer in the storage disk in more than one contiguous sequence of disk blocks with one or more non-transfer-data disk blocks interposed therebetween.

13. The method of claim 1 wherein the data transferred to the peripheral device is stored in a non-contiguous sequence of disk blocks of the storage disk.

14. A method for transferring image data from a storage disk directly to a pelbox comprising the steps of:

sending to the pelbox address information identifying the storage disk locations where the image data is stored;

sending to the pelbox a command to initiate image data transfer from the storage disk directly to the pelbox using the address information received by the pelbox;

causing the storage disk to be exclusively controlled by the pelbox;

after the initiation command is received by the pelbox, transferring image data from the storage disk directly to the pelbox;

writing transferred image data to pelbox memory; and using data written to pelbox memory for a selected pelbox application.

15. The method of claim 14 wherein the image data is stored on more than one storage disk, and the image data is transferred from the more than one storage disk directly to the pelbox.

16. The method of claim 15 wherein the data is transferred from each storage disk directly to the pelbox over more than one communication channel.

17. The method of claim 14 wherein the image data is written by a host computer to the storage disk as a data file, and data corresponding to the data file being written by the host computer is transferred from the storage disk directly to the peripheral device before the data file is completely written to the storage disk by the host computer.

18. The method of claim 14 further comprising the step of providing a pelbox.

19. The method of claim 14 wherein the data transferred to the peripheral device is stored in a non-contiguous sequence of disk blocks of the storage disk.

* * * * *